Aug. 24, 1954  L. P. FRIEDER ET AL  2,687,263
PARACHUTE PACK
Filed March 9, 1951  4 Sheets-Sheet 1
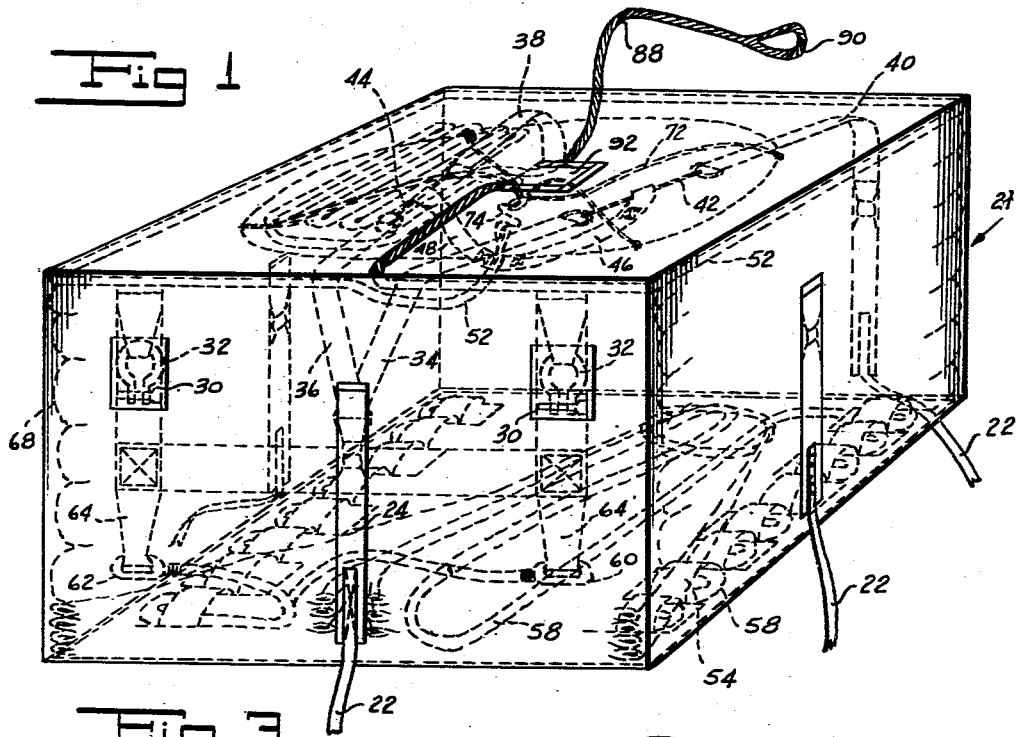
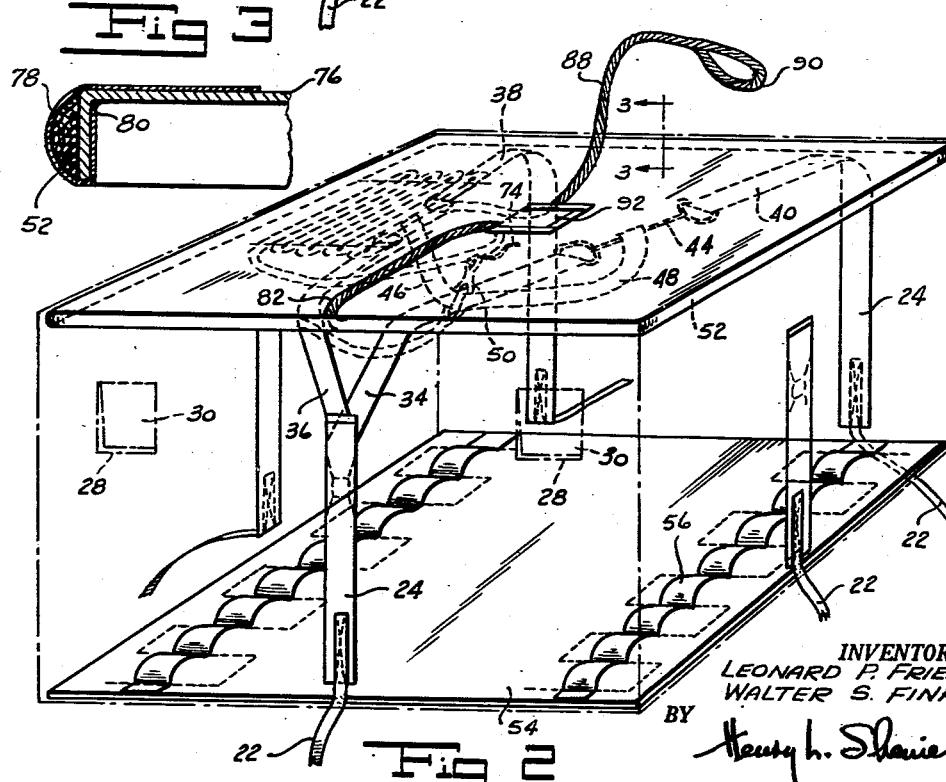
INVENTORS
LEONARD P. FRIEDER
WALTER S. FINKEN
BY
*Henry L. Shavier*
ATTORNEY

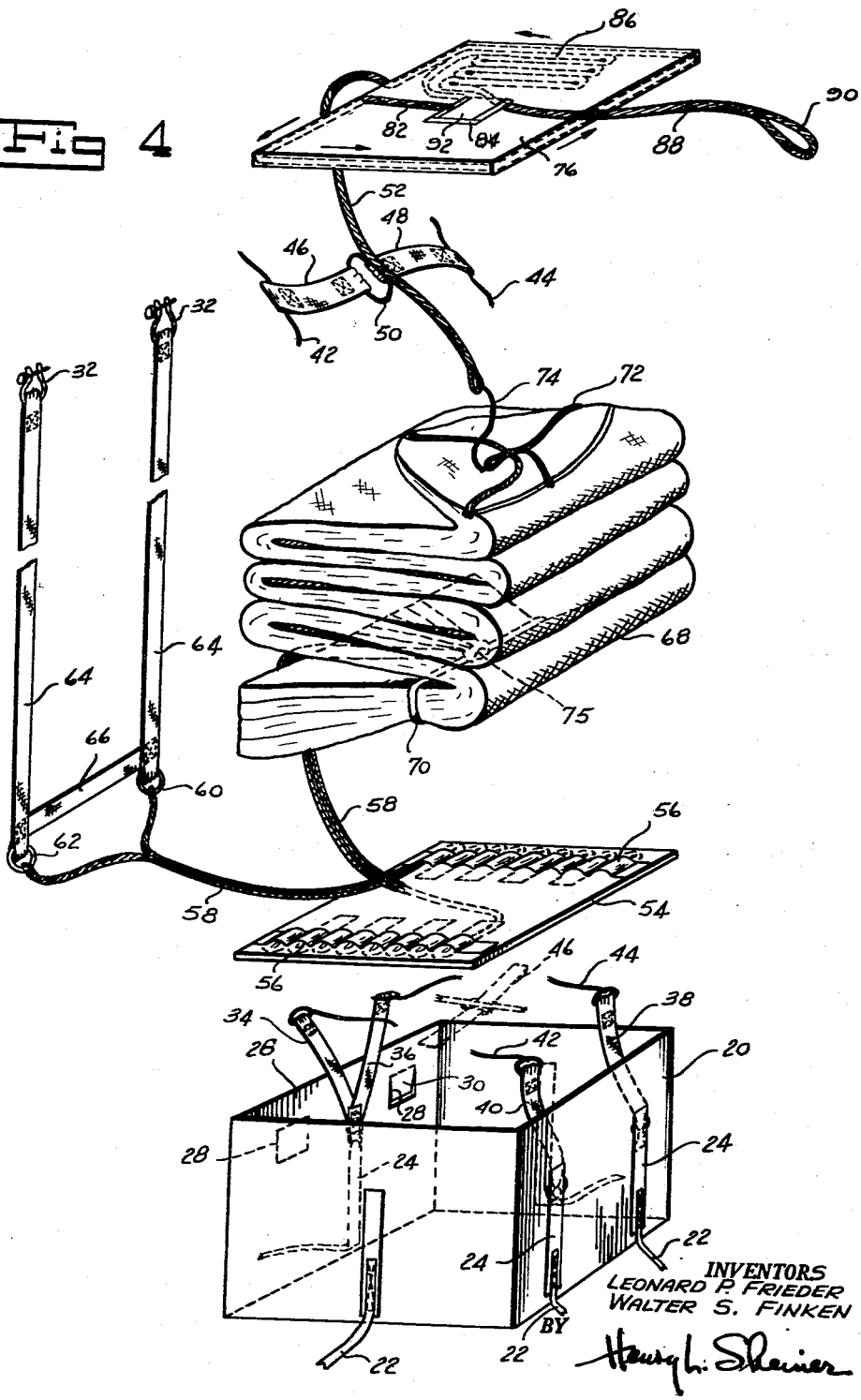

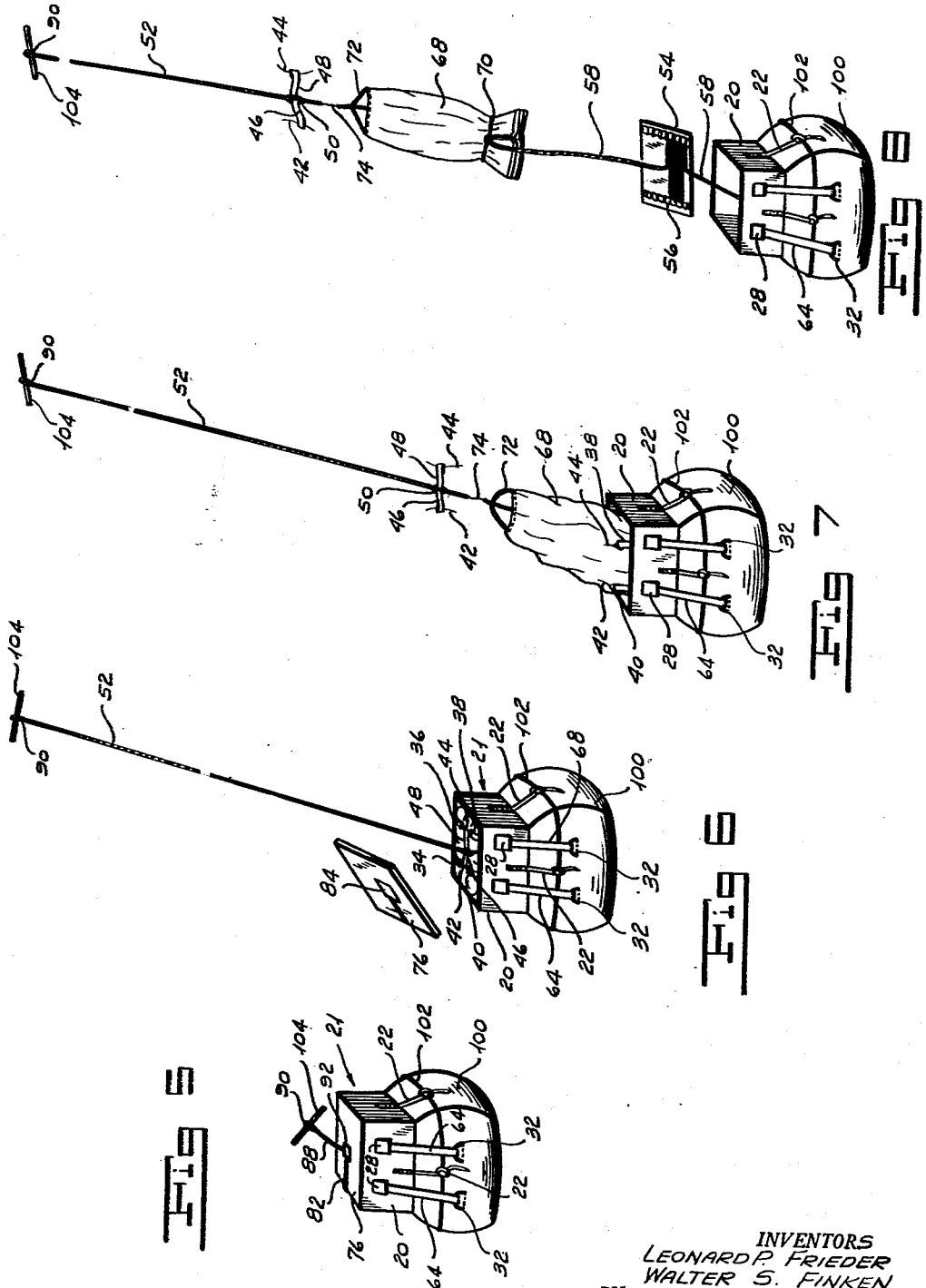

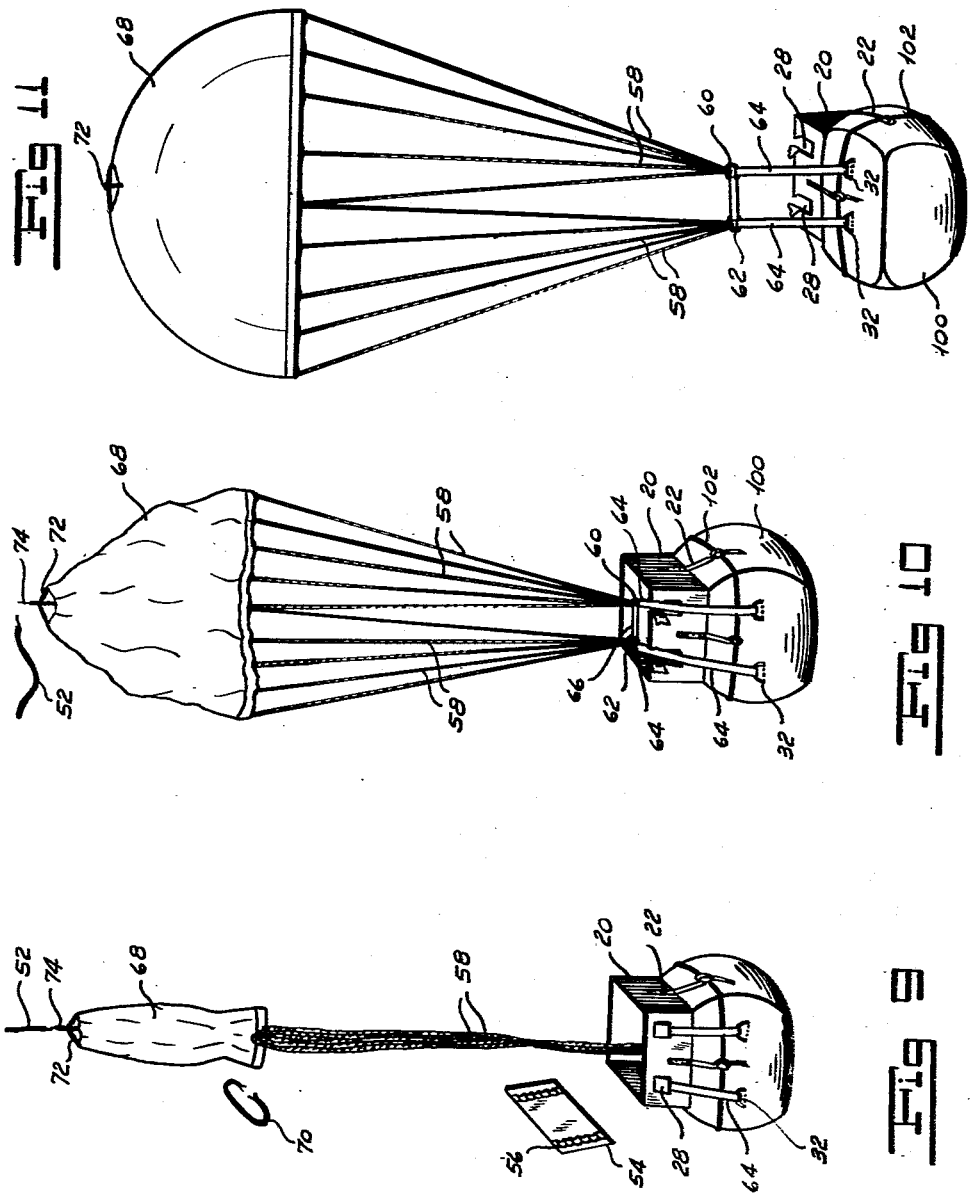

Patented Aug. 24, 1954

2,687,263

UNITED STATES PATENT OFFICE 2,687,263

PARACHUTE PACK

Leonard P. Frieder, Great Neck, and Walter S. Finken, Brooklyn, N. Y.; said Finken assignor to said Frieder Application March 9, 1951, Serial No. 214,655

14 Claims. (Cl. 244—148)

Our invention relates to a parachute pack and more particularly to an improved parachute pack adapted to be used for dropping loads from airplanes.

Parachute packs are known to the art and are adapted to house a parachute to protect it and in a manner to permit the ready and certain opening of the parachute in use. The packs of the prior art have usually been designed for specific loads and are usually expensive to construct.

One object of our invention is to provide a pack adapted to house a parachute to protect it against moisture, mildew and from destructive insects.

Another object of our invention is to provide a parachute pack in which the parachute may be readily and expeditiously streamed for use and will be certain in its operation.

Another object of our invention is to provide a parachute pack which may be readily attached to a variety of loads without disassembling the pack.

Another object of our invention is to provide a parachute pack in which the parachute is streamed in a predetermined sequence ensuring that it will operate without fouling.

Another object of our invention is to provide a parachute pack which is inexpensive in construction while capable of protecting the parachute and housing it in a manner to permit ready and certain operation and attachment to a variety of loads.

Other and further objects of our invention will appear from the following description.

In the accompanying drawings which form part of the instant specification and which are to be read in conjunction therewith and in which like reference numerals are used to indicate like parts in the various views:

Figure 1 is a perspective view of a parachute pack showing one embodiment of our invention illustrating the complete pack.

Figure 2 is a view similar to Figure 1 with parts of the pack omitted in order to show the false bottom and the top cover of the assembly more clearly.

Figure 3 is a sectional view drawn on an enlarged scale taken along the line 3—3 of Figure 2.

Figure 4 is an exploded view showing the manner of connecting the static line to the cover and the parachute, together with the shroud line stowage arrangement.

Figure 5 is a perspective view of the assembly at the start of the drop.

Figure 6 shows the position of parts after the cover has been ripped loose by the static line.

Figure 7 shows the position of parts just after the parachute-securing assembly has been broken with the parachute being pulled out of the container.

Figure 8 is a view of the parts showing the shroud lines beginning to unfurl from the shroud line loop holder.

Figure 9 is a view showing the position of parts just after the parachute hem-securing link is ruptured.

Figure 10 is the position of parts just after the crown weak link is ruptured.

Figure 11 is a view showing the position of parts during descent with a load being carried by the load attaching bridle.

In general our invention contemplates the provision of a container made of fiberboard, cardboard or the like, adapted to house the parachute. The container is provided with a false bottom made of cardboard or the like to which the shroud line loops are secured. The false bottom acts as a shroud line loop holder for holding the shroud line loops. This bottom may be secured to the bottom of the container by means of adhesive or the like, if desired, after the loops have been assembled upon the false bottom. The shroud lines terminate in a pair of rattails to which a bridle for carrying the load is secured. The parachute itself is folded in any desired manner in segments, such as along the gores, from crown to hem. The segments are secured by a rupturable link adjacent the hem adapted to be broken either by the streaming of the parachute or by the tug on the shroud lines. The crown is provided with a bridle which is secured to the static line by means of a rupturable link. The parachute is folded upon itself and secured within the container by means of tapes including a weak link or links which are attached to the static line. The cover is secured to the assembly by the static line running around the edge of the cover. The container is provided with tie tapes to secure it to the load. The bridle is provided with shackles adapted to be pulled through openings in the container and attached to the load. The arrangement is such that when the assembly is dropped the static line will rip the cover off along a peripheral joint, then break the parachute-securing weak link, pull the parachute out of the container, break the hem-securing weak link, permitting the bridle to take the load, ripping through the sides of the container.

More particularly, referring now to the drawings, the container 20 may be made out of cardboard, carton paper, fiberboard, and the like. For purposes of illustration and not by way of limitation, we will describe an assembly for a parachute twenty-four feet in diameter made of four-ounce muslin adapted to support loads between five hundred pounds and six hundred pounds, dropped at velocities of approximately two hundred miles per hour. The container 20 is made of carton paper $\frac{3}{32}$ of an inch thick. The container 20 is shown rectangular, having a length of approximately eighteen inches, and a width of approximately fifteen inches, and a height of approximately twelve inches. It is to be understood, of course, that the shape of the container is immaterial and it may be made of circular or any other desired shape. White cotton tapes 22, having 350-pound tensile strength, are secured to the sides of the container or housing 20. These are for the purpose of securing the housing to the load during the drop. It is understood, of course, that the container 20 does not support the load. This is supported by the parachute shroud lines and bridle, as will be pointed out more fully hereinafter. The cotton tapes 22 are secured to 500-pound tensile strength rayon tapes 24. One wall 26 of the container is formed with a pair of openings 28 normally covered by flaps 30 giving access to the loading attaching shackles 32, as will be pointed out more fully hereinafter. To this wall 26 we secure a pair of rayon tapes 34 and 36 similar to tapes 24. To the opposite wall of the container 20 we secure a second pair of tapes 38 and 40. The end of tape 34 is normally secured to tape 40 by means of a weak link, say, 100-pound rayon braid 42. The tape 36 is secured to the end of tape 38 by means of a similar weak link 44, it being understood, of course, that the tapes 34 and 40 and 36 and 38 are tied around the entire parachute assembly and shroud lines adapted to hold the assembly within the container 20, as will be described more fully hereinafter. A pair of weak link straps 46 and 48 are secured to each other by means of a loop 50 of 500-pound rayon braid. The strap 46 is shorter than the strap 48. The loop 50 is secured to the static line 52 which is made of 1000-pound rayon braid. As will be described hereinafter, the static line is adapted to break the weak links 42 and 44. The difference in length of the weak link strap 46 over the length of the weak link strap 48 enables the weak link 42 to be broken a fraction of a second before the weak link strap 48 breaks the weak link 44. The weak link straps may be made out of heavy cotton webbing.

A false bottom 54 is provided with a pair of cotton tapes 56 formed with loops in which the shroud lines 58 are adapted to be stowed. The ends of the shroud lines are divided into two groups, one of which is secured to a ring 60 and the other of which is secured to a ring 62. The rings 60 and 62 pass through loops formed on the ends of a pair of riser straps 64 to which load-supporting shackles 32 are secured. A cross strap 66 extends between the riser straps 64. The other ends of the shroud lines are secured to the parachute canopy 68 in any desired manner. The parachute canopy is folded from crown to hem along its gores and the folded parachute is secured by means of a weak link 70 made of 75-pound rayon. The group of shrouds extend from the parachute hem through the weak link 70 and then to the false bottom stowage. The parachute is folded back and forth, as shown in Figure 4 so that it will fit within the container 20. Adjacent the crown of the parachute we provide a bridle 72 which is attached to the static cord 52 by means of a weak link 74 made of 250-pound rayon braid. The upper end of the static cord 52 extends around the outside of the junction between the cover 76 and the container 20, being secured in this position by means of a tape 78 which performs the function of holding the cover to the container 20. The tape 78 is secured to the inside of the cover 76 at 80 and extends downwardly along the inside of the cover and around the static line 52 and across the top of the cover being secured by adhesive, or in any other suitable manner. After extending around the cover the static line passes across the top of the cover at 82 and in through an opening 84 and is stowed in loops 86 on the top of the inside of the cover, the end of the static line passing out of the cover through the opening 84 terminating in a portion 88 formed with an eye 90 which may be secured to any suitable part of the aircraft. The opening 84 is normally closed by means of a sealing member 92. The cover with the static line in place is adapted to be set into the top of the carton 20 and secured thereto by adhesive, water glass, or the like.

The complete assembly is shown in Figure 1, from which it will be noted that the cover is sealed as described above with the opening through which the end 88 of the static line passes being taped in moisture-tight condition. The shroud lines are assembled upon the false bottom 54, the parachute is folded as shown in Figure 4, and the rayon tapes passed across the folded parachute assembly and secured by the weak links 42 and 44. The riser straps are stowed with the shackles 32 opposite the openings 28 which are closed by the cover flaps 30. The cover flaps are likewise sealed. The white cotton tie tapes 22 are used to tie the parachute pack to the load merely to hold the assembly thereto. The load is ultimately supported by the parachute through the riser straps 64 and the shackle 32.

In use the parachute pack, indicated generally by the reference numeral 21, is tied to a load 100 by means of the tie tapes 22. Normally a line 102 is tied around the load 100 for this purpose. The eye 90 of the static line end 88 is secured to any suitable part 104 of an aircraft. The shackles 32 are pulled out of the container 20 and secured to a pair of strong points upon the load. The riser straps 64 can be pulled out through the openings 28, the cover flaps 30 being removed when it is desired to use our parachute pack. Until just before use the assembled parachute within the pack is tightly sealed against the entrance of moisture or vermin. The seals for the flaps 30 are broken in order to be able to pull out the shackles and the riser straps. The position of parts just before the drop is shown in Figure 5. When the load begins to fall, the static line pays out of opening 84, being pulled from the inside of the cover until the portion 82 becomes taut. The static line then rips around the top of the cover between the container and the cover in the direction of the arrows of Figure 4 and breaks the seal between the cover and the container 20 permitting the cover to be blown free, as shown in Figure 6. The tug of the static line upon the weak link straps 46 and 48 ruptures the 100-pound weak links 42 and 44 substantially simultaneously. The weak link 74 of 250-pound rayon braid pulls the parachute canopy 68 out of the container 20 by means of the bridle 72. The position of parts is shown in Figure 7. As the load continues to fall, the shroud lines 58 are pulled from the loops 56 upon the false bottom 54. The false bottom may remain in the bottom of the container 20, though this is not necessary. The position of the parts while the shroud lines are being payed out is shown in Figure 8. As soon as the shroud lines have been payed out they will tug upon and break the 75-pound weak link 70. The action of the air upon the falling assembly assists in this action and it frequently happens that the weak link 70 will break before the shroud lines are fully extended by the load. During all these steps the weak link 74, which is made out of 250-pound rayon braid, keeps the crown of the parachute attached to the static line by means of the bridle 72. As soon as the shroud lines 58 are taut the weak link 74 will be ruptured and the parachute canopy 68 will begin to balloon, as shown in Figure 10. As soon as the load is supported by the extended parachute canopy the riser straps 64 will become taut and rip the cardboard above the shackle openings 28. It will be observed that these openings are positioned near the top of the container 20 to permit this action to take place readily. The load then is supported by the riser straps 64 through two groups of shroud lines which are secured to the respective rings 60 and 62. The empty container 20 remains secured to the load by means of the tie tapes 22 and the container acts as a stabilizer, tending to prevent swinging of the load.

It will be seen that we have accomplished the objects of our invention. We have provided a parachute pack adapted to house a parachute to protect it against moisture, mildew and from destructive insects and which may be readily and expeditiously streamed for use and will be automatically unpacked during the drop. Our parachute pack may be readily attached to a variety of loads without disassembling the pack. The parachute housed in our pack is adapted to be streamed in predetermined sequence which will ensure that it will operate without fouling. Our pack is inexpensive in construction and certain in its operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A parachute assembly including in combination a container formed with a bottom and side walls, a cover for the container, means for securing the cover to the container adjacent the periphery of the cover, a parachute, a static cord, a first rupturable link for attaching the static cord to the parachute, holding means including a second rupturable link for positioning the parachute in the container, means for securing the holding means to the static cord, shroud lines, means for positioning the shroud lines in free running relation, load attaching means, means for connecting the load attaching means to the shroud lines and means for positioning the static cord adjacent the periphery of the cover in a position to render the cover-securing means inoperative when the parachute pack is dropped.

2. A parachute assembly as in claim 1 including in combination positioning tapes for attaching the pack to a load and means for securing the positioning tapes to the parachute pack.

3. A parachute assembly as in claim 1 including in combination positioning tapes for attaching the pack to a load and means for securing the positioning tapes to the parachute pack, said holding means also including tapes and means for securing said holding tapes to said positioning tapes.

4. A parachute assembly as in claim 1 in which said cover is formed with an opening, a bight of the static line extending into the container through said opening and means for sealing said opening.

5. A parachute assembly as in claim 1 in which said holding means comprises a pair of second rupturable links, both of said second rupturable links having an aggregate tensile strength less than said first rupturable link.

6. A parachute assembly as in claim 1 in which said holding means comprises a pair of second rupturable links and said means for securing the holding means to the static cord comprises a pair of tapes, one of said tapes being longer than the other whereby said second rupturable links are adapted under tension to break rapidly in succession.

7. A parachute assembly as in claim 1 in which said means for positioning the shroud lines comprises a false bottom and shroud line placing means carried by the false bottom.

8. A parachute assembly as in claim 1 in which said means for connecting the load attaching means to the shroud lines comprises a bridle, load attaching means carried by one end of the bridle, means for securing the other end of the bridle to the shroud lines, one side wall of the container being formed with an opening adapted to give access to the load attaching means.

9. A parachute assembly as in claim 1 in which said means for connecting the load attaching means to the shroud lines comprises a bridle, load attaching means carried by one end of the bridle, means for securing the other end of the bridle to the shroud lines, one side wall of the container being formed with an opening adapted to give access to the load attaching means, said opening being positioned adjacent the top of the container.

10. A parachute assembly as in claim 1 including in combination a crown bridle and means for attaching the bridle to the crown of the parachute and wherein said first rupturable link is attached to the bridle.

11. A parachute assembly as in claim 1 including in combination a third rupturable link positioned adjacent the hem of the parachute and means responsive to the weight of the load upon the shroud lines for breaking the third rupturable link, said third rupturable link being of less tensile strength than said first rupturable link.

12. A parachute assembly as in claim 1 in which the end of the static cord without the container is formed with means for attaching the static cord to an aircraft.

13. A parachute assembly as in claim 1 in which said cover is formed with a depending flange, said static cord being positioned adjacent the periphery of the cover between the container and the flange.

14. A parachute assembly as in claim 1 in which the means for positioning the static cord adjacent the periphery of the cover comprises readily rupturable means.

References Cited in the file of this patent

UNITED STATES PATENTS

| Number | Name | Date |
| --- | --- | --- |
| 1,165,891 | Martin | Dec. 28, 1915 |
| 1,896,000 | Kuhlemann | Jan. 31, 1933 |
| 2,146,990 | Rousselot | Feb. 14, 1939 |
| 2,337,168 | Smith | Dec. 21, 1943 |
| 2,347,205 | Lindsey | Apr. 25, 1944 |
| 2,389,578 | Quilter | Nov. 20, 1945 |
| 2,439,318 | Quilter | Apr. 6, 1948 |
| 2,467,024 | Frieder | Apr. 12, 1949 |
| 2,577,737 | Brown | Dec. 11, 1951 |